Jan. 19, 1971  H. DAHMS  3,556,950
METHOD AND APPARATUS FOR AUTOMATIC ELECTROCHEMICAL ANALYSIS
Filed July 15, 1966  4 Sheets-Sheet 1

INVENTOR
HARALD DAHMS

BY
Thomas J. Kilgannon
ATTORNEY

United States Patent Office 3,556,950
Patented Jan. 19, 1971

3,556,950
METHOD AND APPARATUS FOR AUTOMATIC ELECTROCHEMICAL ANALYSIS
Harald Dahms, Ossining, N.Y., assignor to International Business Machines Corporation, Armonk, N.Y., a corporation of New York
Filed July 15, 1966, Ser. No. 565,504
Int. Cl. G01n 27/46
U.S. Cl. 204—1
23 Claims

ABSTRACT OF THE DISCLOSURE

A method and apparatus for automatically detecting a plurality of unknown constituent concentrations in a fluid is disclosed. Apparatus consisting of a reference electrode and a plurality of other electrodes responsive to the presence of ions and dissolved gases such as calcium, chlorine, hydrogen, sodium, potassium, oxygen, and carbon dioxide are utilized. The apparatus is calibrated in situ by immersing the electrodes in at least two standard solutions which contain different known concentrations of the ions and dissolved gases. After calibration, a sample of fluid containing unknown concentration of ions and dissolved gases is introduced into the system. The electrical outputs of each of the electrodes relative to the reference electrode are sequentially obtained. During calibration, the ion detection surface of silver chloride of the chloride electrode is rejuvenated in situ to prevent inaccuracy due to surface aging of the silver chloride.

---

Because of the ever widening responsibility of medicine for mass screening techniques, major efforts are being made to automate testing procedures which are a necessary prelude to proper diagnosis. Some progress has been made, but, more often than not, the approach has been to select a testing technique or method which is already widely accepted and automate it. Many of these accepted testing techniques were not particularly susceptible to automation and resulting improvements were only marginal because some portion of the testing had to be accomplished manually. In other instances, compatible components were not available and while a plurality of measurements could be made using new approaches, special measurements using old techniques reduced the speed of handling. Because of the nature of the measurements and because the results of such measurements often determine a medical course of action, highly accurate measurements are demanded resulting in a constant recalibration with standard solutions. Often because reference electrodes are inherently inaccurate, the precise measurements demanded cannot in reality be provided. Certain devices said to be automated provide only for the measurement of a single constituent in blood, for example, on a sequential basis and, due to this, require large samples for testing because the sample must be divided to separately test for each constituent.

From the foregoing, it should be clear that the present day testing of blood is not all it could be because known systems are not susceptible to automation; because components are not compatible; because of inherent inaccuracy in measuring devices and, finally, because systems are not available which are capable of measuring a plurality of constituents from small samples. Any such system, for which there is a clear need would meet with immediate application and widespread use.

It is, therefore, an object of this invention to provide a method and apparatus which permits the rapid, accurate measurement of a plurality of constituents in blood from a small sample.

Another object is to provide an automatic system for the measurement of ions and dissolved gases in blood which is superior to presently known systems.

Another object is to provide a method of measurement which insures the accuracy of the measurement taken by frequent comparison with standard solutions.

Another object is to provide a method of measurement wherein periodic calibration of all measuring devices is carried out automatically.

Another object is to provide a system which can handle a broad spectrum of ion measurements including the measurement of chloride ions which required special handling in the prior art.

Another object is to provide a system or automatic apparatus having components which are compatible.

Still another object is to provide a measurement method in which calibration of the measuring devices is carried out in standard solution closely resembling the fluid to be measured by providing standard solutions having ion concentrations which would normally be encountered in blood, for example.

Still another object is to provide a system in which all measurements are referred to a highly stable and accurate reference standard which is compatible with the measuring electrodes.

Yet another object is to provide a method and apparatus for electrochemical analysis of blood constituents or other fluids which is completely automatic and which incorporates data processing techniques to perform complex calculations.

Yet another object is to provide a group of serially disposed sensing electrodes including a chloride ion electrode which can carry out the functions of calibration, measuring and rejuvenation of the chloride electrode in situ.

In accordance with the teaching of the present invention a system and method of operation therefor is provided which automatically measures the organic constituents of blood or other fluids. Such inorganic constituents as chloride ions, hydrogen ions, sodium and potassium ions and dissolved gases such as oxygen and carbon dioxide can be automatically measured by the present system. In addition to measuring ion and dissolved gas concentrations, the system may be calibrated in situ after each measurement to insure accuracy and further may be automatically flushed to insure freedom from contamination by previous samples.

The system provided consists of sources of at least two standard solutions which contain known different concentrations of each of the ions and dissolved gases to be measured. A source for the sample being tested is also provided. Each of the sources is connected to an actuable valve which can be connected to each of the sources in a desired sequence. The valve is designed to connect only one source to its output at a time. A plurality of electrodes each sensitive to a different dissolved gas or ion and a reference electrode are connected in series to the output of the valve so that, upon actuation of the valve, the standard solutions and the test sample are sequentially pumped into contacting relationship with the measuring electrodes and the reference electrode. An actuable pump connected in series with the electrodes carries the fluids into contacting relationship with the electrodes. Once any of the fluids is in contacting relationship with the measuring electrodes and the reference electrode, a measurement step is undertaken. The measurement step is accomplished by sequentially actuating a plurality of relays each of which is associated with a particular ion or dissolved gas measuring electrode. Upon actuation, each relay closes a contact which connects the measuring electrode to a serially connected amplifier and digital voltmeter. The reference electrode which must be present for each measurement is connected directly to the amplifier and digital voltmeter which latter instrument provides a readout of the difference between the measuring voltage and the reference voltage. The digital voltmeter feeds the resulting data in digital form to a data processor which ultimately provides an absolute value of the ion or dissolved gas concentrations in the test sample. Where the ion or dissolved gas concentrations of the standard solutions are measured, the outputs of the digital voltmeter are delivered to the data processor where the information is stored to be used as a calibration curve for subsequent test measurements. One technique utilized which speeds up the measurements considerably without sacrificing accuracy is to use only one standard solution between each measurement of a test sample after an initial calibration using two standard solutions has been made. In this manner, accuracy is enhanced because calibration information relating to the drift of each electrode due to recovery time or other factors is provided. This information permits adjustment of a point on the calibration curve and a new calibration curve can be generated from the one piece of information, because the calibration curve is linear and of constant slope. Depending upon the variation in accuracy of the measuring electrodes with time, the calibration with a single standard solution need not be made between each test sample measurement. A number of test samples may be run between calibrations further speeding sample measurements. All of the apparatus and functions described hereinabove are controlled by a timer which has been programmed to actuate the valve and pump and to actuate the relays sequentially so that measurements may be taken from the electrodes.

From the foregoing, it should be apparent that all measurements, calibrations and other functions are accomplished in situ, that is, without the need for manually handling or removing any of the components. One of the features of the system, which make it automatic is the provision of a chloride ion sensitive electrode which can be rejuvenated in situ. This is accomplished by providing a counterelectrode and circuitry, under control of the timer, which permits the cyclical reversal of polarity of an applied voltage to remove and replace the ion sensitive silver chloride coating on the measuring electrode without removing the electrode from the system. The rejuvenating step is accomplished using at least one of the standard solutions or the fluid being measured as a source of the required chloride ions. The rejuvenating step prevents "ageing" of the ion sensitive silver chloride coating from measurement to measurement and is a major factor contributing to the overall accuracy of the system.

The foregoing and other objects, features and advantages of the present invention will be apparent from the following more particular description of a preferred embodiment of the invention as illustrated in the accompanying drawings.

Figure 1:
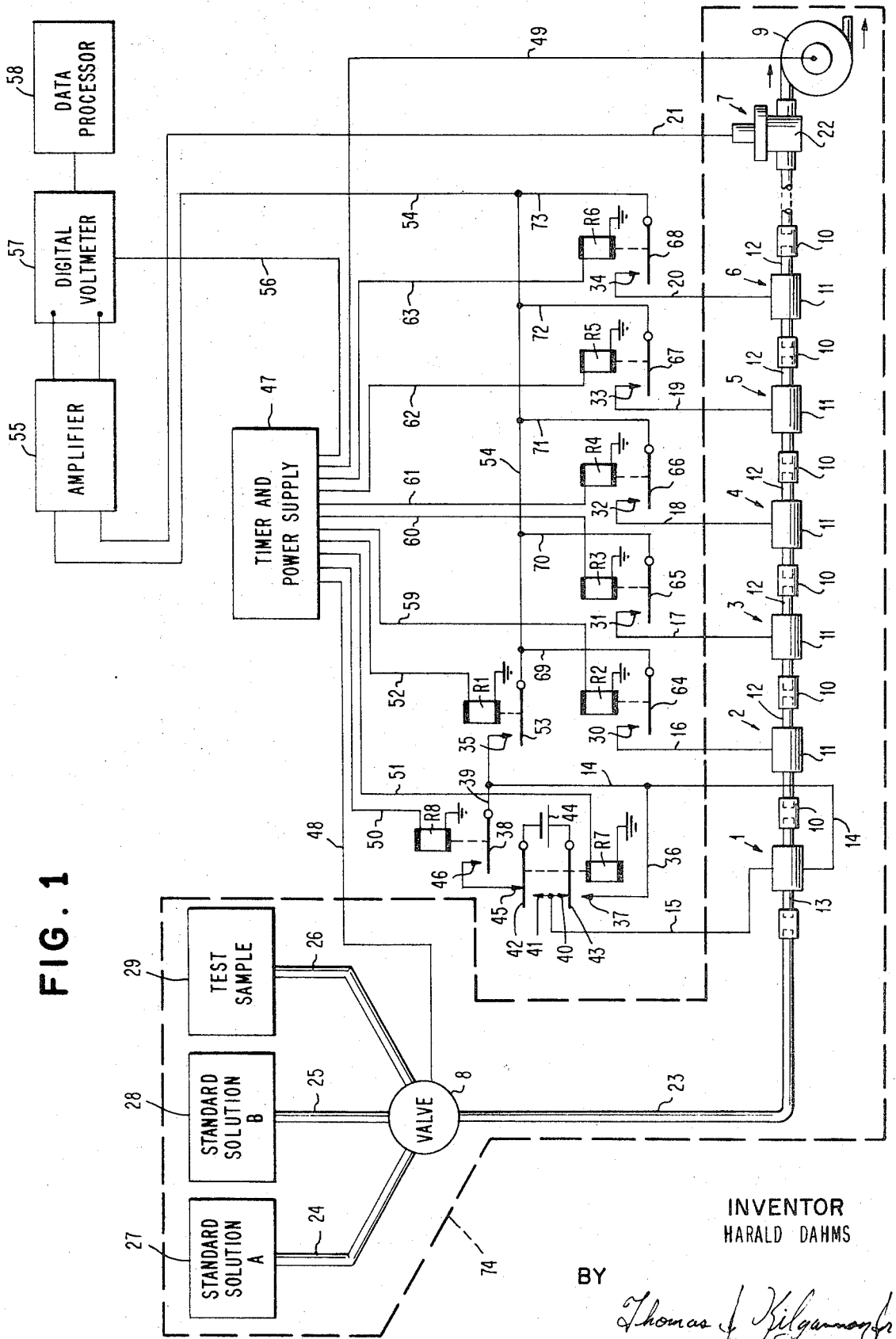
FIG. 1 is a schematic-block diagram representation of automatic electrochemical analysis apparatus utilized in carrying out the teaching of the present invention.

Referring now to FIG. 1, there is shown a schematic-block diagram of apparatus used for the automatic electrochemical analysis of fluids in accordance with the teaching of the present invention. While the apparatus of FIG. 1 to be described can be utilized for the automatic electrochemical analysis of any fluid, it will be described heerinafter in connection with the analysis of ions and dissolved gases in blood. It should, therefore, be understood that the description of the electrochemical analysis of blood is by way of example and not for purposes of limitation.

Figure 3:
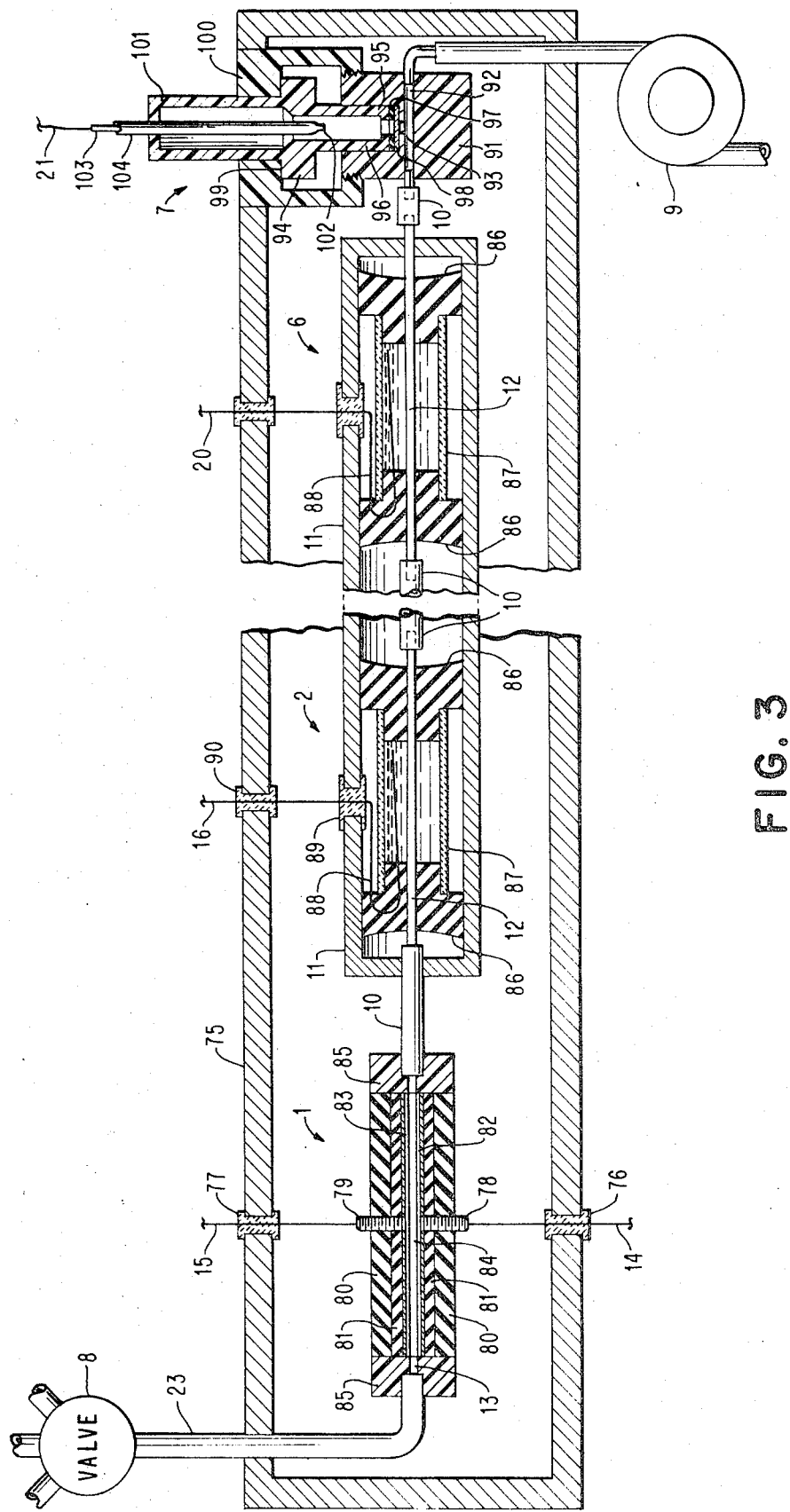
FIG. 3 is a cross-sectional drawing showing the silver-silver chloride electrode, electrodes which respond to sodium, potassium and hydrogen ions, and a reference electrode disposed in serial relationship in accordance with the teaching of the present invention.

In FIG. 1, a plurality of electrodes 1 to 6 and a reference electrode 7 are shown in series arrangement with an actuable valve 8 and an actuable pump 9. Electrodes 1 to 7, which will be described in detail hereinafter, in conjunction with FIG. 3, are connected with each other by sections of plastic tubing 10. Electrodes 2–6 consist of sealed housings 11 and capillary tubes 12 disposed coaxially of housings 11. Each capillary is made of a special glass which is sensitive to at least a different ion. Where blood is being measured the principal ion constituents are chloride, hydrogen, calcium, sodium and potassium and the principal dissolved gases are oxygen and carbon dioxide. The space between sealed housings 11 and capillary tubes 12 is filled with electrolyte (0.1 N HCl) to provide a conductive path between ion sensitive capillary tubes 12 and a silver-silver chloride conductor immersed in the electrolyte.

Electrode 1 has a different configuration from electrodes 2–6 and is used to measure the chloride ion concentration in the sample being measured. Electrode 1 consists of a capillary section 13 containing an ion sensitive silver electrode coated with silver chloride and a second electrode which acts as a counterelectrode when a voltage is applied across the ion sensitive electrode and the counterelectrode. These latter electrodes are not shown in FIG. 1, but will be described in detail in conjunction with FIG. 3. Let it suffice, for the moment, to say that conductors 14, 15 are connected in FIG. 1 to these electrodes.

Returning to electrodes 2–6, conductors 16, 17, 18, 19, 20 are connected to conductors (not shown) immersed in the electrolyte of electrodes 2, 3, 4, 5 and 6, respectively.

In FIG. 1, reference electrode 7, has a special configuration, which will be described in detail hereinafter in connection with FIG. 3, which permits highly stable and accurate voltages to be generated. The output of reference electrode 7 is carried by conductor 21 which is conneted internally of housing 22 to a calomel or silver chloride electrode.

Valve 8 is connected from its output port via tubing 23 to electrode 1 and at its input ports via tubing 24, 25, 26 to containers 27, 28, 29, respectively, containing standard solution A, standard solution B and a test sample of blood, respectively. Valve 8 may be any suitable valve which is capable of being electrically actuated. A detailed description of a suitable valve will be given hereinbelow in conjunction with FIGS. 4A and 4B.

The standard solutions A and B referred to above were specially formulated and calibrated since multicomponent standard solutions were not available commercially. In formulating and calibrating the standard solutions A and B, the aim was to bracket the actual range occurring in human plasma for all the desired constituents. Chemicals used in preparing the solutions were:

NaCl dried at 600° C. for 2 hours, $KH_2PO_4$, $NaH_2PO_4xH_2O$ dried at 110° C. for more than 12 hours and then used as $NaH_2PO_4$ (theoretical weight loss was achieved within $<\pm 1\%$), and $Na_2HPO_4 x 12H_2O$ (hydration was determined experimentally and agreed within $<\pm 1\%$).

The ionic activities of all constituents were then determined by potentiometric measurements using pure NaCl solutions and NBS pH solutions as primary standards.

Pure NaCl solutions were made up in concentrations of 0.1024 M, 0.0784 M, and 0.0576 M. The activity coefficients of these concentrations are tabulated for various temperatures. (R. A. Robinson & R. H. Stokes, Electrolyte Solutions (Butterworths, London, 1959) 2nd edition.)

The activity coefficients at 38° C. were determined by graphical interpolation to be 0.7730, 0.7904, and 0.8100 respectively.

Plots of activity vs. voltage output sodium electrode-reference electrode were then constructed. Deviations from linearity were less than 1% on the activity scale. The unknown activities of the formulated standards were then read off the voltage-activity plots. This procedure was repeated at least five times for each point. The activities so determined were always within ±1%.

The activity of the chloride ion was measured in an analogous way using the same NaCl solutions as primary standards.

The pH was standardized against National Bureau of Standard buffers (R. G. Bates, Determination of pH (John Wiley & Sons, Inc., New York 1964) page 76) with pH values of 6.840 and 7.384 made up from NBS standard samples 186–I-b and 186–II-b.

The determination of potassium ion activity is a more difficult problem since the "potassium electrode" also responds to sodium. In order to obtain an approximate value, the activity coefficient of sodium was used to compute the potassium activity.

All activities are given in Table I below:

TABLE I.—FORMULATION OF STANDARD SOLUTIONS

| | Concentrations | Activities (38° C.) |
|---|---|---|
| Standard solution A: | | |
| 0.00300 M $KH_2PO_4$ | K, 0.00300 M | K, 0.022 M* |
| 0.01200 M $NaH_2PO_4$ | Na, 0.12800 M | Na, 0.09397 M |
| 0.01500 M $Na_2HPO_4$ | Cl, 0.08600 M | Cl, 0.06412 M |
| 0.08600 M NaCl | | pH, 6.640 |
| Standard solution B: | | |
| 0.00700 M $KH_2PO_4$ | K, 0.00700 M | K, 0.0051 M* |
| 0.0245 M $Na_2HPO_4$ | Na, 0.16000 M | Na, 0.1132 M |
| 0.111 M NaCl | Cl, 0.11100 M | Cl, 0.08147 M |
| | | pH, 7.236 |

*Calculated by using the experimentally determined activity coefficient for sodium.

Returning now to FIG. 1, conductors 16, 17, 18, 19, 20 are shown connected to contacts 30, 31, 32, 33, 34, respectively, of normally open relays R2, R3, R4, R5 and R6, respectively. Conductor 14 of electrode 1 is connected to the measuring electrode of electrode 1 and to a contact 35 of relay R1. Conductor 14 is also connected over conductor 36 to a contact 37 of relay R7. Finally, conductor 14 is connected to the armature 38 of relay R8 over conductor 39. Conductor 15 which is connected to the counter-electrode of electrode 1 is connected to contacts 40, 41 of relay R7. The armatures 42, 43 of relay R7 are connected across a 1.5 volt battery 44. In the unactuated condition armatures 42 ad 43 of relay R7 rest on normally closed contacts 45 and 40. Upon actuation of relay R8, a conductive path is closed over conductors 14 and 39 thru armature 38 and contact 46 of relay R8 to contact 45 and armature 42 of relay R7 to the negative side of battery 44; then, from the positive side of battery 44, thru armature 43 and contact 40 of relay R7 over conductor 15 to the counter-electrode of electrode 1. Upon actuation of relay R7, armatures 42, 43 of relay R7 move to contacts 41, 37, respectively, and the voltage across the measuring electrode and counter-electrode of electrode 1 is reversed. As will be seen hereinafter, the voltage is applied and reversed at electrode 1 for times sufficient to cause the removal and replacement of the ion sensitive silver chloride on the measuring electrode of electrode 1 each time a standard solution or a test sample is processed.

All the relays shown in FIG. 1 are controlled by timer and power supply 47 hereinafter referred to as timer 47. In addition, timer 47 also controls the position of valve 8 and the actuation of pump 9. Timer 47 is of conventional construction and circuitry well known to those skilled in this art. In the actual construction of the system of FIG. 1 commercially available pneumatic time delays were used.

Figure 2:
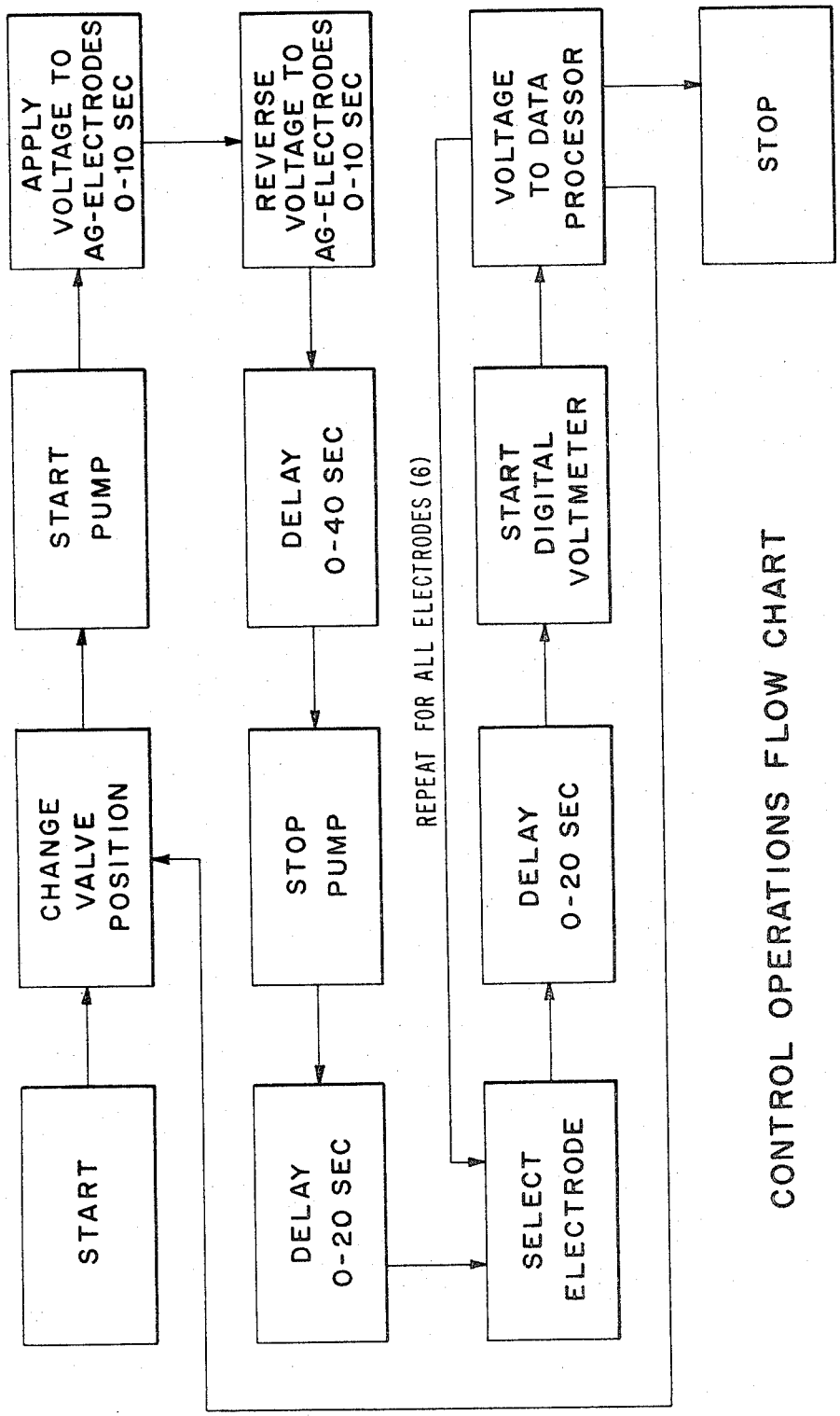
FIG. 2 is a flow chart of the sequence of operations using either of the standard solutions provided or the test sample being measured.

FIG. 2 shows a flow chart of the sequence of operations governed by timer 47 for measurements using either of the standard solutions or a test sample.

In the first step (change valve position), valve 8 is actuated over conductor 48 from timer 47, to connect container 27 through tubing 24 with tubing 23. Pump 9 is then actuated (start pump) over conductor 49 from timer 47 to carry standard solution A into contacting relationship with electrodes 1–6 and reference electrode 7. During the pumping relay R8 is energized over conductor 50 from timer 47, and a voltage from battery 44 is applied (apply voltage to AG-electrodes) to the measuring and counterelectrodes of electrode 1. Relay R7 is then actuated over conductor 51 from timer 47 and a reverse voltage is applied (reverse voltage to AG-electrodes) to electrode 1. After a desired delay, (delay) pump 9 is stopped (stop pump) and relays R7 and R8 are returned to an unactivated state (delay). Timer 47 then actuates relay R1 (select electrode) over lead 52 moving armature 53 into contact with contact 35. The potential developed at the measuring electrode of electrode 1 is carried over conductor 14, thru contact 35 and armature 53 of relay R1 to a bus 54 which is connected to amplifier 55. Simultaneously with this measurement, the potential developed at reference electrode 7 is carried over conductor 21 to amplifier 55. After an appropriate delay, a signal from timer 47 over conductor 56 starts digital voltmeter 57 (start digital voltmeter). The output of voltmeter 57 is then fed to data processor 58 (voltage to data processor) where it may be stored on tape or punch cards for subsequent processing. At this point, another electrode, electrode 2 for example, is selected and the process from the select electrode step is repeated until all the electrodes are calibrated with standard solution A.

The whole sequence is then repeated with standard solution B for all electrodes. Finally, the same sequence is utilized when a test sample is being measured insuring that the test sample meets the same conditions as the standard solutions and consequently enhancing the accuracy of the system.

In carrying out the sequence of FIG. 2, relays R2–R6 are actuated from timer 47 over conductors 59, 60, 61, 62 and 63 respectively, causing armatures 64, 65, 66, 67 and 68, respectively, to close on contacts 30, 31, 32, 33 and 34, respectively. Conductors 69, 70, 71, 72 and 73 all of which are connected to bus 54, apply the potential of their associated electrode to amplifier 55.

An initial calibration is made using standard solutions A and B, using the above described sequence and then a measurement of the unknown sample is made. While FIG. 1 shows only one test sample container 29, it should be appreciated, that many other test sample containers can be connected into the system limited only by the number of positions available on actuable valve 8. When a number of test samples are being measured, one after another, calibration of electrodes 1–6 is accomplished using only one of the standard solutions A or B. This is possible because the slope of the calibration curves initially obtained remains substantially constant, the only variation being an upward or downward movement of the whole calibration curve. A significant speed-up in the processing of unknown samples is thereby permitted. It should also be appreciated that a further speed-up in processing can be obtained by eliminating the calibration of electrodes 1–6 with a single standard solution after each measurement of a test sample is made. Thus, a number of test samples may be processed without a calibration step between each measurement. The number of test samples which can be processed consecutively without a calibration, of course, depends on the variation of sensitivity of the electrodes with time. To overcome variations in calibration due to temperature, electrodes 1–6, containers 27, 28 and 29 and valve 8 are kept in a temperature controlled environment, shown schematically in FIG. 1, by dotted enclosure 74. The temperature is kept at 38° C.±0.1° C.

In actual embodiment of FIG. 1, pump 9 consists of a modified peristalic suction pump. The modification consisted in decreasing the speed by a factor of thirty by introducing appropriate gear ratios.

Amplifier 55 in FIG. 1, may be any appropriate amplifier which will amplify the voltages resulting from electrodes 1–6. The output of amplifier 55, as has been mentioned, is converted to a digital output by voltmeter 57. The system of FIG. 1, has an overall accuracy from electrode voltage input to data processor 58 ±0.03 m. v.

Referring now to FIG. 3, thereis shown a cross-sectional view of the details of electrodes 1–6 and reference electrode 7. The configurations of these electrodes make the concept of a completely automatic electrochemical system practically feasible. This last statement is particulraly true with respect to electrode 1 and reference electrode 7, for without the ability to provide in situ rejuvenation and extremely high stability and accuracy, the system of FIG. 1 would be only semi-automatic and would not meet the accuracy standards desired in a system of this type.

Considering first electrode 1 in FIG. 3, it is seen that conductors 14, 15 pass through housing 75 via insulators 76, 77, respectively, and connect to contacts 78, 79 which in turn penetrate successive layers of plastic 80 (Delrin) and rubber 81 to make contact with measuring electrode 82 and counterelectrode 83. Measuring electrode 82 and counterelectrode 83 form the lower and upper arcs of circular capillary 13 and are maintained in insulated spaced relationship with each other by virtue of plastic members 84 which are shaped to mate with the lower and upper arcs of measuring electrode 82 and counter-electrode 83 to form circular capillary 13. The structure of electrode 1 can be seen in greater detail in applicant's patent, U.S. 3,458,421, issued July 29, 1969 entitled Electrode With Integral Flow Channel filed of even date and assigned to the same assignee as the persent invention.

Capillary 13 has an inside diameter of approximately one millimeter and connects to tubing 23 and tubing 10 via connectors 85. Tubing 10, and 25 have inner diameters of one millimeter also.

When valve 8 and pump 9 are actuated as described in connection with FIG. 1, fluid fills capillary 13. Regardless of whether the fluid is a standard solution A or B, or the test fluid, a voltage is applied across electrodes 82 and 83 via conductors 14 and 15, electrodes 82 having a negative polarity and electrode 83 a positive polarity applied thereto. The voltage is applied for a time sufficient to remove the ion-sensitive silver chloride coating from electrode 82. The voltage is then reversed, as described in conjunction with FIG. 1, and the silver chloride is replaced on measuring electrode 82. In this manner, measuring electrode 82 is "rejuvenated" in situ by virtue of its particular construction and, in addition to contributing to the automation of the system of FIG. 1, the accuracy of measuring of electrode 1 is enhanced and consequently the overall accuracy of the system.

In FIG. 3, electrodes 2–6 have a similar structural configuration and differ from each other only in the type of ion-sensitive capillary tubing incorporated in each electrode. The electrode glass capillaries were obtained commercially and have inside diameters of about one millimeter and a wall thickness of 0.1–0.2 mm.

Electrodes 2–6 in FIG. 3 have the following structural features. Two stoppers 86 are inserted into opposite ends of a glass tube 87. Both stoppers are then punctured by a low gauge hypodermic needle (gauge 13). Glass capillary 12 is then introduced into the opening of the hypodermic needle. The needle is then gently retracted so that capillary 12 remains behind. A silver wire 88 previously coated with silver chloride is introduced in the same manner. Finally, a 0.1 N HCl solution is injected into the space between glass tube 87 and capillary 12 by a hypodermic syringe. Silver wire 88 passes through housing 11 via insulator 89 where it is connected to conductor 16 which in turn passes through insulator 90 in housing 75. Tubing 10 connects capillaries 12 with each other and also isolates them electrically.

As mentioned hereinabove, electrodes 2–6 are similar in every way except for the ion-sensitive glass used in each. Glass capillaries sensitive to sodium have the following composition: 11% $Na_2O$, 18% $Al_2O_3$, 71% $SiO_2$ and respond to sodium ions according to the Nernst equation:

$$E = E_0 + S \log a_{Na} \quad (1)$$

where

E = voltage in volts
$E_0$ = standard potential in volts
S = constant (0.06174 v. at 38° C.)
$a_{Na}$ = activity of the sodium ion A capillary glass having the composition (27% $Na_2O$, 4% $Al_2O_3$, 69% $SiO_2$) was used for the determination of potassium and responds according to the equation $$E = E_0 + S \log (a_K + k A_{Na}) \quad (2)$$

where

E, $E_0$, S and $A_{Na}$ are as defined above and $a_K$ = activity of potassium ion
k = selectivity constant The pH capillary consists of (22% $Na_2O$, 6% $C_aO$, 72% $SiO_2$) and responds according to the equation $$E = E_0 + S \log a_H \quad (3)$$

where

E, $E_0$, S, are as defined above and
$a_H$ = activity of the hydrogen ion

The silver-silver chloride electrode coated with AgCl constructed as shown in conjunction with FIG. 3 responds to the chloride ion according to the equation $$E = E_0 - S \log a_{Cl} \quad (4)$$

where

E, $E_0$ and S are as defined above and
$a_{Cl}$ = the activity of the chloride ion.

This last Equation 4 is valid if no other ions forming insoluble compounds with silver ion, such as bromide ions, etc., are present.

In order to determine unknown ionic activities from Equations 1 to 4, the constants $E_0$, S and k have to be calibrated with solutions of known ionic activity. To minimize calibration procedures, only two calibration solutions A and B are utilized. This procedure does not present any difficulty for Equations 1, 3 and 4 since they contain only two unknowns ($E_0$ and S) per equation. In Equation 2, which contains three unknowns constants $E_0$ and k are calibrated while S is fixed at the theoretical value of 0.0167 v.

Since S (theoretical value 61.7 mv.) varies in practice generally only by a few millivolts, this constant is the most suitable for being assigned a fixed value. Furthermore, small changes in S can be compensated by adjusting k.

Experimental data were processed in a computer with systematic variations in the value of S. The results showed that variations of S by a few millivolts from the theoretical value do not change the computed potassium activity by more than a fraction of 1%. In the treatment of the potassium electrode, S is fixed, therefore, at the theoretical value of 61.7 mv. and values of $E_0$ and k are computed using this value.

Referring again to FIG. 3, reference electrode 7 is shown in cross section. Electrode 7 is shown extending through housing 75. The lower portion 91 thereof contains a capillary channel 92 which is machined in portion 91. An aperture 93, approximately one millimeter in diameter, intersects channel 92 and interconnects standard electrode housing 94 with channel 92. Hollow housing 94 has a hollow apertured male portion 95 which is receivable in female receptacle portion 96. Interposed between the bottom of male portion 95 and the bottom of female portion 96 are an apertured rubber gasket 97 and a membrane 98. Shoulder 99 extending from housing 94 is designed to engage cap 100 and threads on the extremities thereof are designed to mate with threads on the upper part of section 91. In this manner, gasket 97 and membrane 98 are fixedly held across aperture 93 by male portion 95 when cap 100 is screwed to the upper part of section 91. Hollow portion 101 extends upwardly from shoulder 99 through an opening in cap 100 and contains an aperture 102 through which a commercial type standard electrode 103 and electrolyte container 104 extend. Container 104 has a wick 106 at the bottom thereof to provide a conductive path between an electrolyte in container 104 and an electrolyte which fills housing 94. Conductor 21 is connected to electrode 103 and connects directly to amplifier 55 as shown in FIG. 1.

In operation, channel 92 is filled with either the standard solutions A or B or with the test sample. Membrane 98 which is preferably made of wide pore cellophane then forms a sharp, well defined boundary between the fluid in channel 92 and the electrolyte contained in hollow housing 94. Since the cellophane membrane 98 is permeable to ions and dissolved gases, a conductive path is provided between the fluid in channel 92 and the electrolyte contained in housing 94. By providing a membrane of the nature of membrane 98, "hysteresis" effects are eliminated and stable and accurate measurements using a relatively simple structure are provided. Hysteresis may be characterized as an effect which causes instability and inaccuracy in a reference electrode because the wick normally utilized in commercially available reference electrodes does not have time to clear itself of the solution into which it was dipped before the next measurement is made. By providing a sharp, well defined boundary between the test sample and the electrolyte, the ions from one measurement can be dissipated in the electrolyte before the time of the next measurement arrives. In this manner, the characteristics of the conductive path from the test sample through the membrane and electrolyte to the wick, electrolyte and standard electrode are maintained substantially the same because the amount of fluid from channel 92 entering the electrolyte is negligible in comparison to the volume of electrolyte in hollow housing 94. The use of the cellophane membrane as the interface between the flow channel and the reference electrode structure also permits substantially smooth flow in the channel and clotting tendencies in blood due to wicks and the like in flow channels are substantially eliminated. Using the reference electrode 7, voltages obtained after changing test solutions were reproducible by <0.1 mv. A more detailed description of the structure of reference electrode 7, may be found in applicant's copending application Ser. No. 565,659, now U.S. Pat. No. 3,505,196, filed of even date, entitled "Reference Electrode" and assigned to the same assignee as the present invention.

As has been mentioned hereinabove, the system of FIG. 1 is not limited to the detection of ions only but also has application where dissolved gases such as oxygen and carbon dioxide are to be measured. Thus, electrodes sensitive to dissolved gases can be substituted for any of the electrodes 2–6 or inserted in series with electrodes 2–6. Commercially available electrodes have been found to be compatible with the present system. From the foregoing, it should be clear that the system of FIG. 1 is extremely versatile and can be adapted to measure the concentrations of any ion or dissolved gas if suitable electrodes are available.

In connection with the electrodes 1–6, it was found desirable to insert potentiometers (not shown) in series with leads 14, 69, 70, 71, 72 and 73 to "buck out" a major portion of the voltages supplied by electrodes 1–6. Since only a change in voltage rather than its absolute value is all that is sought, this technique brings the voltages being handled into a 0–100 mv. range and the resulting system accuracy is enhanced since amplifier 55 must now only operate within this relatively narrow range.

Figure 4A:
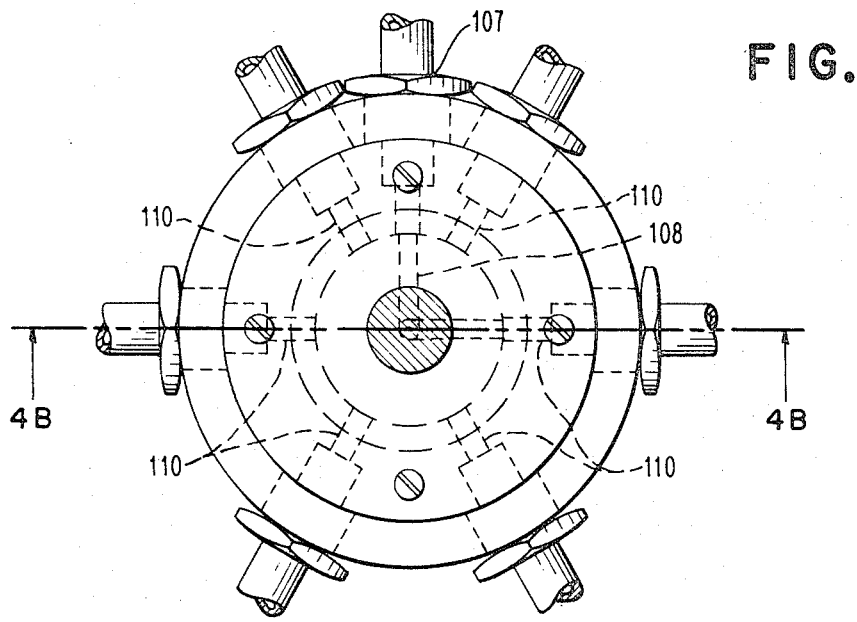
FIG. 4A is a top view of an actuable valve utilized to interconnect the standard solutions and the test samples with the measuring electrodes.
Figure 4B:
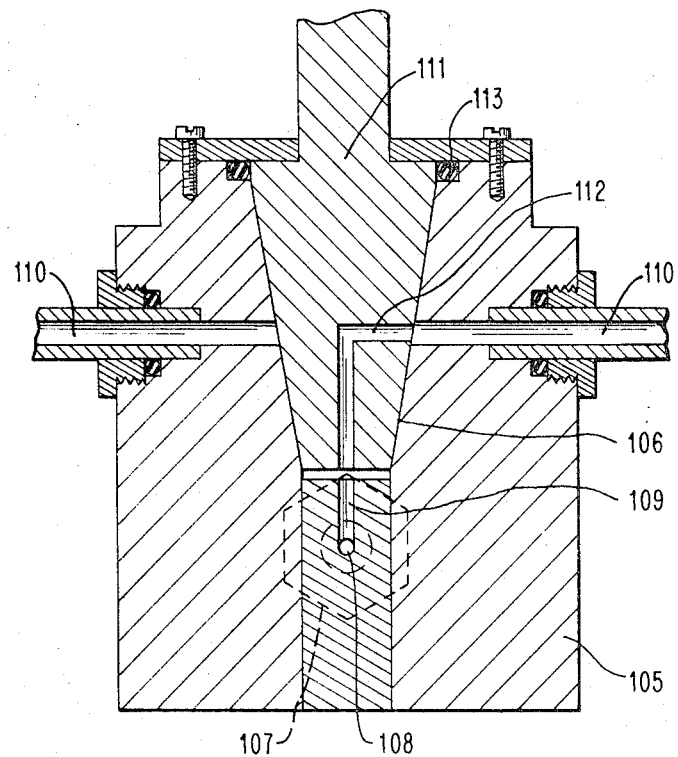
FIG. 4B is a cross-sectional view taken along lines 4B in FIG. 4A.

Referring now to FIGS. 4A and 4B, there is shown a cross-sectional view and a top view, respectively, of valve 8 of FIG. 1 used in the practice of this invention. Valve 8 is made entirely of plastic and consists of a base section 105 having a tapered cavity 106 disposed coaxially with the center line of the valve. A cylindrical shaft extends from the bottom of cavity 106 containing output port 107. Port 107 connects to a capillary channel 108 which intersects a vertical capillary channel 109. Base section 105 contains a plurality of radially extending capillary channels 110 which are drilled therein and intersects the edge of tapered cavity 106 in the same horizontal plane. Tapered plug 111 is receivable in cavity 106 and mates with cavity 106 in sliding fit relationship. Plug 111 is rotatable in cavity 106 by a stepping motor (not shown) which causes the horizontal position of an L-shaped channel 112 to mate with each of radial channels 110 as plug 111 is rotated. The vertical portion of channel 112, of course, mates with vertical capillary channel 109 at all times and conducts fluid from each of radial channels 110 to output port 107. An O-ring 113 along with retaining member 114 retains plug 111 in cavity 106.

As can be seen from a consideration of FIGS. 1, 4A and 4B, capillaries 110 can be connected to containers 27, 28 and 29 and may be connected to other containers containing other test sample or solutions for flushing the system. The shaft of plug 111 is mechanically coupled to a 12-position stepping motor (not shown) which is energized over conductor 48 (see FIG. 1) from timer 47.

The above described apparatus in conjunction with data processing equipment provides fast and highly accurate measurements of a plurality of samples each having a number of dfferent ions and dissolved gases contained therein. It is particularly useful in measuring these constituents in blood. Great care has been taken to insure against the clotting of blood samples by using Teflon tubing and by making certain that sharp discontinuities due to electrodes or interconnections are avoided. It should be noted that all tubing and capillaries have diameter of 1 mm. and that all electrodes provide a useful response when the volume of the test sample is no greater than one cubic centimeter. Good results can be obtained using only a half cubic centimeter of fluid.

The timing of the events shown in FIG. 2 can be varied widely, so great flexibility in this regard has been built into the system. A representative cycling time per solution is 65 seconds.

With respect to the data processing approach utilized in connection with the system, the approach was relatively straight forward with the exception of the computation of the potassium activity which involved an iteration procedure.

While the invention has been particularly shown and described with reference to a preferred embodiment thereof, it will be understood by those skilled in the art that various changes in form and details may be made therein without departing from the spirit and scope of the invention.

What is claimed is:

1. A method for automatically detecting the concentrations of selected constituents in a fluid costaining unknown constituent concentrations comprising the steps of providing a reference electrode and a plurality of other electrodes, each of said other electrodes being responsive to at least a given different constituent, periodically calibrating in situ said other electrodes with known constituent concentrations to obtain calibration curve data for each of said other electrodes, and periodically measuring in situ the electrical output of each of said other electrodes against the electrical output of said reference electrode to obtain measurements indicative of said unknown constituent concentrations, periodically rejuvenating in situ the constituent detecting surface of at least one of said other electrodes to prevent inaccuracy due to surface aging by applying a voltage to said at least one of said other electrodes for a time sufficient to remove the constituent detecting surface and applying a voltage of reverse polarity to said last mentioned electrode for a time sufficient to replace said constituent detecting surface.

2. A method according to claim 1 further including the step of recording said calibration data and said measurements indicative of said unknown constituent concentrations.

3. A method according to claim 2 further including the step of processing said recorded calibration data and said measurements indicative of said unknown constituent concentrations to provide absolute values of said unknown constituent concentrations.

4. A method according to claim 1 wherein the step of calibrating periodically includes the step of initially calibrating said other electrodes with at least two standard solutions having different known constituent concentrations to provide a calibration curve for each of said other electrodes by measuring the electrical output of said other electrodes during said calibrating with at least two standard solutions.

5. A method according to claim 1 wherein the step of calibrating periodically includes the step of calibrating each of said other electrodes after said initial calibration with a single standard solution of known constituent concentrations to provide an indication of drift of a point on each of said calibration curves by measuring the electrical output of said other electrodes during said calibrating with a single standard solution.

6. A method according to claim 1 wherein the step of measuring in situ includes the steps of introducing said fluid into the region of said other electrodes and said reference electrode to immerse said electrodes therein, providing a sharp, well defined boundary between said fluid and said reference electrode, and sequentially switching among each of said other electrodes to measure the potentials due to the unknown constituent concentrations in said fluid.

7. A method according to claim 1 wherein said constituent detecting surface is silver chloride and said at least one of said other electrodes is the chloride electrode.

8. A method according to claim 1 further including the step of providing a counterelectrode in situ with said at least one of said other electrodes to permit the removal and replacement of said constituent detecting surface.

9. A method according to claim 1 wherein said plurality of other electrodes each responsive to a given different constituent includes electrodes responsive to ions and electrodes responsive to dissolved gases.

10. A method according to claim 9 wherein different constituent electrodes responsive to ions includes electrodes responsive to ions selected from the group consisting of sodium, potassium, chloride, calcium and hydrogen.

11. A method according to claim 9 wherein said electrodes responsive to dissolved gases includes electrodes responsive to dissolved gases selected from the group consisting of oxygen and carbon dioxide.

12. A method for automatically detecting a plurality of unknown constituent concentrations in a fluid comprising the steps of, disposing a reference electrode, a first plurality of electrodes each responsive to a different ion selected from the group consisting of calcium, chloride, hydrogen, potassium and sodium and a second plurality of electrodes each responsive to a different dissolved gas selected from the group consisting of oxygen and carbon dioxide in series spaced relationship, calibrating in situ said first and second plurality of electrodes with at least two standard solutions each containing different known concentrations of each of said ions in said group of ions and different known concentrations of each of said dissolved gases in said group of dissolved gases to obtain calibration curve data for each of said first and second plurality of electrodes, introducing at least one sample of fluid containing a plurality of unknown ions and dissolved gases the concentrations of which are to be measured into said serially disposed first and second plurality of electrodes, measuring in situ the electrical output of each of said first and second plurality of electrodes against the electrical output of said reference electrode to obtain measurements indicative of each of the concentration of said group of ions and said group of dissolved gases, and rejuvenating in situ the ion detection surface of silver chloride of said chloride electrode during said calibrating and introducing steps to prevent inaccuracy due to surface aging by applying a voltage to said chloride electrode for a time sufficient to remove the silver chloride ion detecting surface and applying a voltage of reverse polarity to said chloride electrode for a time sufficient to replace said silver chloride ion detecting surface.

13. A method according to claim 12 further including the step of calibrating in situ said first and second plurality of electrodes with a single standard solution of known ion and dissolved gas concentrations to provide an indication of drift of a point on each of said calibration curves.

14. A method according to claim 13 further including the step of sequentially introducing a plurality of fluids having unknown ion and dissolved gas concentrations which are to be measured into said serially disposed first and second plurality of electrodes.

15. A method according to claim 12 wherein the step of measuring in situ includes the step of sequentially switching among each of said first and second plurality of electrodes to measure the potential due to unknown ion and dissolved gas concentrations in said fluid.

16. A method according to claim 12 further including the step of disposing a silver counterelectrode in situ with said chloride electrode to permit the removal and replacement of said silver chloride.

17. A system for automatically measuring the concentrations of selected constituents in a fluid comprising in combination a plurality of sources of standard solutions each containing known but different concentrations of said constituents, a source of fluid the constituent concentrations of which are to be measured, a reference electrode, a plurality of electrodes each responsive to at least a given different constituent disposed in series relationship with each other and with said reference electrode, means for cyclically introducing at least one of said standard solutions and said fluid into conducting relationship with said electrodes, including a pump disposed in series relationship with said detecting means and one of said sources of standard solution and said source of fluid, and a valve connected between said sources and said detection means for cyclically interconnecting one of said sources of standard solutions and said source of fluid with said pump, means coupled to said electrodes for cyclically and selectively obtaining in situ measurements indicative of said constituent concentrations in said standard solutions and said fluid, means connected to said means to obtain measurements for processing said measurements to obtain absolute values of said constituent concentrations in said fluid, and means connected to at least one of said electrodes responsive to a given different constituent for cyclically rejuvenating in situ the constituent sensitive surface of said at least one of said electrodes.

18. A system according to claim 17 wherein said plurality of electrodes each responsive to at least a given different constituent includes electrodes responsive to ions.

19. A system according to claim 18 wherein said electrodes responsive to ions includes electrodes responsive to ions selected from the group consisting of calcium, chloride, hydrogen, potassium and sodium.

20. A system according to claim 18 wherein said plurality of electrodes each responsive to at least a given different constituent includes electrodes responsive to dissolved gases.

21. A system according to claim 20 wherein said electrodes responsive to dissolved gases includes electrodes responsive to dissolved gases selected from the group consisting of oxygen and carbon dioxide.

22. A system according to claim 17 wherein said at least one of said electrodes is a chloride electrode and said constituent detecting surface is silver chloride.

23. A system according to claim 17 wherein said means for obtbaining in situ measurements includes electrode selection means to cyclically obtain signals indicative of the present of said constituents and said means for processing said measurements includes means for amplifying said signals and means connected to said amplifying means to convert said signal from analog to digital form.

References Cited

UNITED STATES PATENTS

| | | | |
|---|---|---|---|
| 2,760,922 | 8/1956 | Williams | 204—195 |
| 2,805,191 | 9/1957 | Hersch | 204—1.1 |
| 2,886,771 | 5/1959 | Vincent | 324—30 |
| 2,930,967 | 3/1960 | Laird et al. | 204—195 |
| 2,989,377 | 6/1961 | Leisey | 23—253 |
| 2,998,371 | 8/1961 | Sabins | 204—196 |
| 3,151,052 | 9/1964 | Arthur et al. | 204—195 |
| 3,241,432 | 3/1966 | Skeggs et al. | 23—230 |
| 3,327,204 | 6/1967 | Hillier et al. | 204—195 |
| 3,438,875 | 4/1969 | Watanabe et al. | 204—195 |

OTHER REFERENCES

Beckman Instructions 1203–A. "Silver Electrodes."

TA-HSUNG TUNG, Primary Examiner

U.S. Cl. X.R.

23—230, 253; 204—195; 324—29